(12) United States Patent
Lee

(10) Patent No.: US 8,585,323 B2
(45) Date of Patent: Nov. 19, 2013

(54) METHOD FOR REPAIRING A DAMAGED SEWAGE PIPELINE WITHOUT DIGGING A TRENCH

(75) Inventor: Dong-Ryul Lee, Kyungjoo-si (KR)

(73) Assignee: Myung Ja Han, Daegu-Si (KR)

( * ) Notice: Subject to any disclaimer, the term of this patent is extended or adjusted under 35 U.S.C. 154(b) by 138 days.

(21) Appl. No.: 13/170,147

(22) Filed: Jun. 27, 2011

(65) Prior Publication Data

US 2011/0318111 A1 Dec. 29, 2011

(30) Foreign Application Priority Data

Jun. 28, 2010 (KR) ........................ 10-2010-0061314

(51) Int. Cl.
*F16L 55/18* (2006.01)

(52) U.S. Cl.
USPC ......................................... 405/184.1; 138/97

(58) Field of Classification Search
CPC ..................................................... F16L 55/18
USPC ......... 405/184.1, 184.2; 138/97, 98; 166/227; 264/36.16, 269
See application file for complete search history.

(56) References Cited

U.S. PATENT DOCUMENTS

| | | | | |
|---|---|---|---|---|
| 5,372,162 A * | 12/1994 | Frey | ................................. | 138/98 |
| 5,983,948 A * | 11/1999 | Yagi et al. | ........................ | 138/98 |
| 6,416,692 B1 * | 7/2002 | Iwasaki-Higbee | .......... | 264/36.17 |
| 6,969,427 B1 * | 11/2005 | Noles, Jr. | ...................... | 118/317 |
| 2010/0116372 A1 * | 5/2010 | Perstnev et al. | .................. | 138/98 |

* cited by examiner

*Primary Examiner* — David Bagnell
*Assistant Examiner* — Kyle Armstrong
(74) *Attorney, Agent, or Firm* — Patent Office of Dr. Chung Park

(57) ABSTRACT

The present invention relates to a method for repairing a damaged sewage pipeline. In the method, leakage on the upper and lower portions of the sewage pipeline, a manhole and a household branch pipe within a repairing section is checked. Then, partial trenchless repairing for the damaged portion of the pipeline is performed and a primary repairing liquid is filled into the pipeline at high pressure. Next, the primary repairing liquid remaining in the pipeline is sucked and a secondary repairing liquid is injected into the interior of the pipeline. Then, the secondary repairing liquid remaining in the pipeline is sucked. Subsequently, intermediate cleaning is performed and the repairing liquids accumulated on the bottom portion of the pipeline is removed.

15 Claims, 6 Drawing Sheets

METHOD FOR REPAIRING A DAMAGED SEWAGE PIPELINE WITHOUT DIGGING A TRENCH

CROSS REFERENCE TO RELATED APPLICATIONS

This application claims the benefit of Korean Patent Application No. 10-2010-0061314, entitled "Total environmentally-friendly trenchless repairing method," filed on Jun. 28, 2010, now issued as Korean Patent No. 10-1013539, which is hereby incorporated herein by reference in its entirety.

BACKGROUND OF THE INVENTION

1. Field of the Invention

The present invention relates to a total environmentally-friendly trenchless repairing method, and more particularly, to a total environmentally-friendly trenchless repairing method that is capable of performing the sealing for a manhole, a pipeline, and a branch pipe and the repairing for a leaking portion thereon, without forming trenches.

2. Background of the Related Art

A variety of conventional methods for repairing damage portions in a sewage pipeline have been proposed.

Generally, a sewage pipeline, which is used in sewage facilities, is formed by connecting a plurality of pipes formed of a cast-iron pipe, a concrete pipe, a plastic pipe or the like and is buried under the ground to allow polluted sewage such as domestic sewage and industrial sewage to flow therealong. Thus, the sewage is collected to a sewage treatment plant and is purified and treated therein.

For the protection of the natural environment and the prevention of the environmental pollution, thus, careful attention should be paid to prevent the sewage from leaking before the sewage reaches the sewage treatment plant after drained from households, and furthermore to keep ground water or soil from being polluted by the sewage. Because of the aging of the concrete sewage pipeline buried underground, however, cracks or holes may be formed on the concrete sewage pipeline, and because of the stages on the sewage pipeline formed by the differential settlement of the ground and the jointing portion of the pipeline, gaps may be formed on the sewage pipeline, such that the domestic sewage and the industrial sewage may be introduced into the underground to cause the ground water or soil to be polluted. Reversely, clean ground water may be introduced into the sewage pipeline to cause the purification costs consumed in water quality environment offices of cities and provinces to be excessively increased, which generates the loss of national tax. In the rainy season, especially, the above-mentioned problems become serious. So as to prevent the ground water or soil from being polluted by the sewage discharged by the holes or damages formed on the sewage pipeline, accordingly, it is necessary to repair the damaged sewage pipeline. In the past, thus, digging in the ground is performed, and the damaged sewage pipeline is separated from the entire pipeline and is exchanged with new one. Filling in the ground is then carried out. In this case, however, a high cost of repair and time investment should be needed.

Recently, a variety of trenchless repairing methods for sewage pipelines have been developed and suggested by advanced countries, and further, many countries have turned their attention to severe damages like the pollution of the ground water and soil caused by the damages of the sewage pipelines, such that they become focused on the repairing of the damaged sewage pipelines. As examples of the conventional repairing methods for the damaged sewage pipelines, a water stop material-packing method, an epoxy application method, a reinforcement lining method, and a snap lock method have been introduced and applied.

First, the water stop material-packing method is developed in U.S.A., which is generally applicable for the repairing for a portion of pipeline into which water is invaded. According to this method, urethane or epoxy solution is injected on the damaged portion found through the water sealing checking to prevent the invasion of water from the outside. However, the repairing method is performed separately from reinforcing work, and therefore, the water stop material-packing method is not ideal at the time when the pipe is destroyed or the reinforcement for the connected portion of pipes is needed. In case where the formed crack has a length longer than a packer, further, it is impossible to perform the repairing at a time.

The epoxy application method is developed in Switzerland, which is generally applicable for the repairing of the cracked or damaged portion of the pipeline or the connected portions of the pipeline. According to the epoxy application method, obstacles are removed by using a cutter robot and a repairing portion is ground. Next, the ground portion is completely dried by a heat gun, after which an epoxy resin is applied to the dried portion, which requires a relatively long cure time. Therefore, the epoxy application method has some disadvantages in that the working cost is very high, and the period of cure time is very long.

The reinforcement lining method is one of the repairing methods most widely used in recent days, which is generally applicable for the repairing for a portion on which leakage occurs due to the cracks, damages and stages of joints of the pipeline. According to the reinforcement lining method, it is checked whether an obstacle exists on the damaged portion of the pipeline, after which the obstacle is completely removed by means of high pressure jet cleaning. Next, a glass fiber felt which is made by impregnating resin into glass fiber is mounted on a packer and is moved to a repairing portion. The glass fiber felt is then compressed onto the portion by means of compressed air. The reinforcement lining method is performed just to reinforce the pipeline, but it is impossible to stop the invasion of water into the pipeline.

The snap lock method is developed in Japan, which is applicable to the repairing for a portion where no protruded crack is formed on a pipeline or for a portion where leakage occurs. According to the snap lock method, a rubber tube (or rubber sleeve) having both ends on which the water stop rubber is mounted is attached to a stainless sleeve, the water stop rubber being expanded up to 5 times to 10 times in volume when contacted with water. The stainless sleeve is brought into close contact with a damaged portion on the pipeline, such that the leaking water comes into contact with the water stop rubber to permit the water stop rubber to be expanded in volume, thereby blocking the leaking sewage. In the snap lock method, as the repairing material is just mounted, the repairing process is completed, thereby providing some advantages in that the repairing work is very simple and the repairing time is short, but because of the formation of the stage between the internal face of the sewage pipeline and the section of the water stop rubber mounted on the internal face of the sewage pipeline, the sewage flows along the repaired portion after the repairing of the damaged pipeline to cause foreign matters to be accumulated on the formed stage.

The variety of conventional pipeline repairing methods, which have been introduced up to now as mentioned above, have some advantages and disadvantages according to the respective methods, and are largely divided into water stop methods wherein the leakage or the invasion of water stops and reinforcement methods wherein the damaged pipeline is repaired. However, the conventional pipeline repairing methods do not have any plan to prevent the leakage and the invasion of water caused by the damages occurring after the damaged pipeline has been repaired. Moreover, after the water stop method is applied, if the invasion of water or the leakage happens again, the existing reinforcement sheet should be removed to perform the repairing work again.

According to the conventional repairing methods, additionally, a tube is inserted into the interior of the damaged pipeline when the sewage pipeline is repaired, but in this case, the diameter of the pipeline is reduced. Thus, the repairing appears completed when seen from the outside, but the sewage pipeline is decreased in diameter to cause an amount of water discharged to be reduced. The discharging is not gently performed within a given time period, and as a result, a serious problem occurs in which said sewage overflows toward the outside of the pipeline from the upper side of the pipeline.

SUMMARY OF THE INVENTION

Accordingly, the present invention has been made in view of the above-mentioned problems occurring in the prior art, and it is an object of the present invention to provide a total environmentally-friendly trenchless repairing method that is capable of performing the sealing for a manhole, a pipeline, and a branch pipe and the repairing for a leaking portion thereon, without forming trenches.

It is another object of the present invention to provide a total environmentally-friendly trenchless repairing method that is capable of directly filling repairing liquids into a pipeline, which improves conventional methods wherein no access for mechanical repairing is allowed for a given pipe diameter of about 200 mm in a sewage pipeline buried under the ground, thereby performing the repairing work for connected portions (contacted portions) of a household branch pipe, discharge equipment trouble portions, and fine crack portions.

To accomplish the above objects, according to the present invention, there is provided a total environmentally-friendly trenchless repairing method that includes the steps of: cutting obstacles existing inside the interior of a sewage pipeline by using a robot, photographing the interior of the sewage pipeline by using a closed circuit television, and performing high pressure cleaning for the sewage pipeline; closing the upper and lower sides of the upper and lower portions of the sewage pipeline, a manhole and a household branch pipe within a repairing section and filling water into the closed repaired section to check whether leakage occurs or not therefrom; if it is found from the checked result that an amount of leakage is large, covering a repairing portion with a mixture into which Bentonite is contained to block the leakage, thereby precisely performing partial trenchless repairing for the damaged portion of the sewage pipeline; if the leakage is kept after the partial repairing for the leaking portion, closing the upper and lower portions of the sewage pipeline and the upper portion of the household branch pipe within the repairing section and filling a primary repairing liquid into the pipeline at high pressure to allow the primary repairing liquid to be permeatedly applied to the damaged portion inside the pipeline; after a given time period in a range between 40 minutes and one hour has passed after the filling of the primary repairing liquid, sucking the primary repairing liquid remaining in the pipeline and storing the sucked liquid into a tank; additionally injecting a secondary repairing liquid into the interior of the pipeline to allow the secondary repairing liquid to be impregnatedly permeated through the damaged portion of the pipeline, to be mixed with sand, soil, or materials existing the gaps in the sand or soil scattering around the pipeline, and to be then cured; after a given time period in a range between 40 minutes and one hour has passed after the filling of the secondary repairing liquid, sucking the secondary repairing liquid remaining in the pipeline and storing the sucked liquid into a tank; performing intermediate cleaning for the sewage pipeline, the manhole, and the household branch line after the sucking of the secondary repairing liquid; removing the primary and secondary repairing liquids accumulated on the bottom portion of the pipeline after the intermediate cleaning of the pipeline; and performing water sealing checking through a vacuum pressure test for the manhole and inserting the closed circuit television into the interior of the pipeline to check the state after the completion of the repairing work, thereby finally removing the primary and secondary repairing liquids and other foreign matters existing thereinto.

According to the present invention, desirably, in the steps of filling the primary repairing liquid, sucking the primary repairing liquid, filling the secondary repairing liquid, and sucking the secondary repairing liquid, a pipeline-blocking packer is disposed on the upper portion of the sewage pipeline within the repairing section in such a manner as to be expanded to block the upper portion of the sewage pipeline, a stopper is disposed on the lower portion thereof in such a manner as to be expanded to block the lower portion thereof, a safety stopper is disposed on the back of the stopper in such a manner as to firmly support the stopper, and an upper packer is disposed on the upper portion of the household branch pipe in such a manner as to be expanded to block the upper portion of the household branch pipe.

According to the present invention, desirably, in the steps of filling the primary repairing liquid, sucking the primary repairing liquid, filling the secondary repairing liquid, and sucking the secondary repairing liquid, the sewage pipeline, the manhole and the household branch pipe within the repairing section are blocked at the same time, and then, the repairing work for all of them is performed at the same time.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a total environmentally-friendly trenchless repairing method according to the present invention will be in detail given with reference to the attached drawing.

Figure 1:
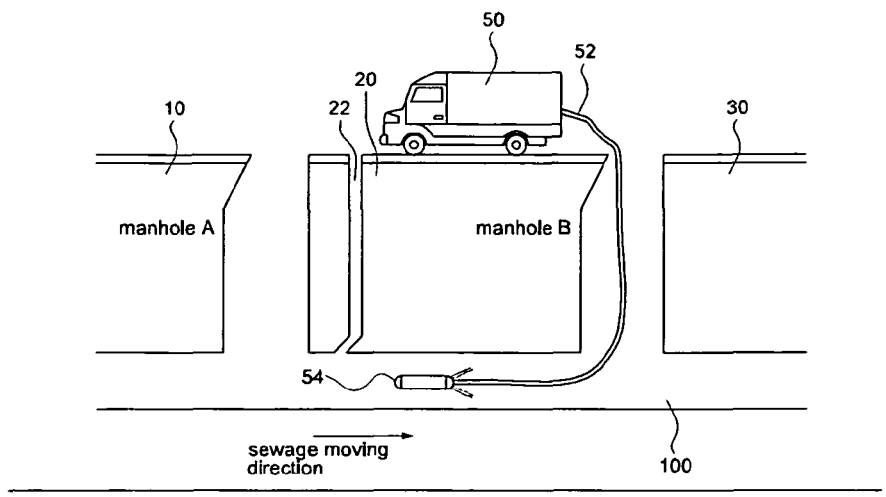
FIG. 1 is a schematic sectional view showing high pressure cleaning for a sewage pipeline in a total environmentally-friendly trenchless repairing method according to the present invention.
Figure 2:
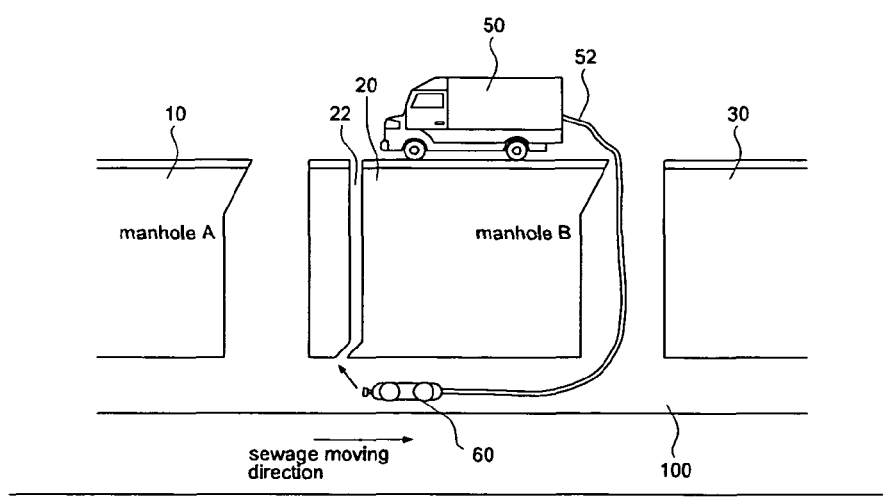
FIG. 2 is a schematic sectional view showing a CCTV photographing process for checking the internal state of the pipeline in the total environmentally-friendly trenchless repairing method according to the present invention.
Figure 3:
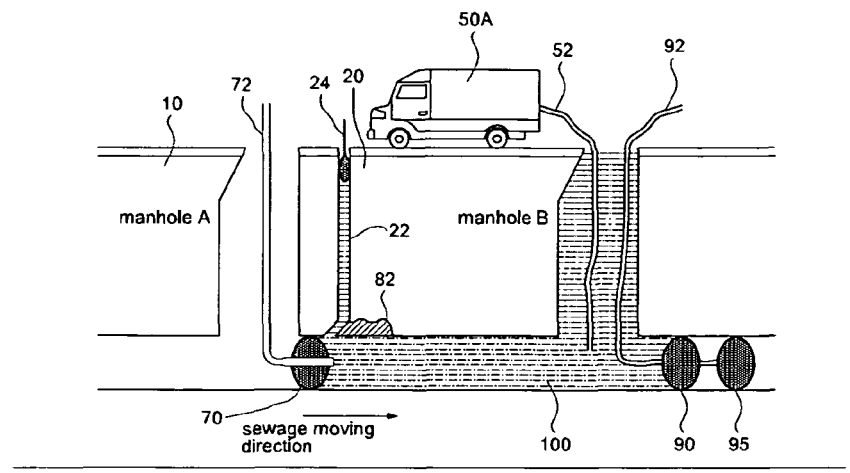
FIG. 3 is a schematic sectional view showing the processes for closing a repairing portion and filling a primary repairing liquid Ta in the total environmentally-friendly trenchless repairing method according to the present invention.
Figure 4:
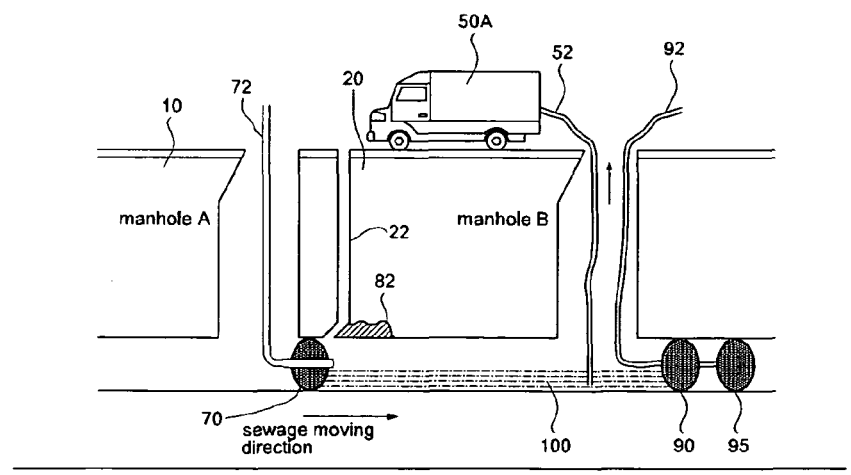
FIG. 4 is a schematic sectional view showing a process for sucking the primary repairing liquid Ta filled in FIG. 3.

FIG. 1 is a schematic sectional view showing high pressure cleaning for a sewage pipeline in a total environmentally-friendly trenchless repairing method according to the present invention, FIG. 2 is a schematic sectional view showing a CCTV photographing process for checking the internal state of the pipeline in the total environmentally-friendly trenchless repairing method according to the present invention, FIG. 3 is a schematic sectional view showing the processes for closing a repairing portion and filling a primary repairing liquid Ta in the total environmentally-friendly trenchless repairing method according to the present invention, and FIG. 4 is a schematic sectional view showing a process for sucking the primary repairing liquid Ta filled in FIG. 3.

Now, an explanation on the main reference numerals denoted in the drawings and their functions will be given.

Reference numerals 10, 20 and 30 denote manholes A, B and C covering a sewage pipeline, and a reference numeral 22 denotes a household branch pipe disposed between the manholes. A reference numeral 24 denotes an upper packer disposed on the upper portion of the household branch pipe 22 to seal the household branch pipe 22, and 50, 50A and 50B denote a cleaning vehicle or a cleaning and repairing vehicle on which a repairing liquid is stored or a pump is mounted. A reference numeral 52 denotes a high pressure hose drawn from the cleaning vehicle 50 to fill or suck the repairing liquid, 54 denotes a high pressure cleaning nozzle connected to an end portion of the high pressure hose 52 to clean the pipeline, and 60 denotes a closed circuit television (CCTV) moved into the pipeline to check the internal state of the pipeline.

Further, a reference numeral 70 denotes a pipeline-blocking packer adapted to block the pipeline to maintain a water sealing state, 70A denotes a flexible packer disposed on a portion from which the pipeline-blocking packer 70 is removed, 72 denotes a repairing liquid-supplying and demanding hose disposed to be passed through the pipeline-blocking packer 70 to fill and suck the repairing liquid, 82 denotes a primary repairing liquid Ta, 84 denotes a secondary repairing liquid Tb, 90 denotes a stopper adapted to seal the interior of the pipeline, 92 denotes a pressure hose for the stopper 90 connected to the stopper 90, 95 denotes a safety stopper connected to the stopper 90 to safely maintain the sealing state together with the stopper 90, 100 denotes the sewage pipeline to be repaired and checked, 110 denotes a liquid-remaining portion where the liquid remains on the bottom portion of the sewage pipeline.

Referring to FIG. 1, in a first step of a total environmentally-friendly trenchless repairing method according to the present invention, the cleaning vehicle 50 is first positioned among the manholes 10, 20 and 30, and the high pressure hose 20 is taken from the cleaning vehicle 50. Next, the high pressure cleaning nozzle 54 is mounted at the end portion of the high pressure hose 52 so as to clean the interior of the sewage pipeline 100, thereby performing the cleaning for the sewage pipeline 100.

So as to provide high safety and efficiency, at this time, the high pressure hose 52 should resist the internal pressure of at least 200 bar and about 150 l/min. The household branch pipe 22 disposed between the manholes can be also cleaned trough the pressure injected from the high pressure cleaning nozzle 54.

Referring to FIG. 2, after the cleaning for the sewage pipeline 100 has been completed, the CCTV 60 is inserted into the interior of the high pressure hose 52, and a CCTV lens is turned and moved in left and right sides to check the damaged state of the sewage pipeline 100. The photographed images can be recorded, and the internal state of the sewage pipeline 100 can be traced in real time on a site to perform more precise checking. In this figure, the sewage in the interior of the sewage pipeline 100 flows from the left side to the right side.

Referring to FIG. 3, a process for filling the primary repairing liquid Ta after a repairing portion is closed will be in detail described.

The high pressure hose 52 is taken from the cleaning and repairing vehicle 50A and is connected to the interior of the sewage pipeline 100, thereby being ready to fill the primary repairing liquid Ta. At this time, the packer 70 is disposed to block one end of the sewage pipeline 100, and the stopper 90 is to block the other end of the sewage pipeline 100. Further, the safety stopper 95 is doubly disposed thereon so as to reinforce the stopper 90.

Moreover, the repairing liquid-supplying and demanding hose 72 is to be passed through the packer 70, so as to fill and suck the repairing liquid into and from the interior of the sewage pipeline 100, and the upper packer 24 is disposed to seal the upper portion of the household branch pipe 22, thereby repairing the leakage occurring on the household branch pipe 22. At this time, the repairing liquid-supplying and demanding hose 72 has a diameter of at least 50 mm so as to perform the filling and sucking operations, and in case of the repairing liquid-supplying and demanding hose 72 having a large capacity, it should have a diameter between 80 mm and 90 mm. Further, the upper packer 24 has a pressure hose having a diameter of at least ¾ inches mounted thereon, and the pressure hose is disposed to be passed through the upper packer 24.

Additionally, the pressure hose 92 for stopper is disposed to supply the pressure to the stopper 90 and the safety stopper 95 and to thus seal the sewage pipeline 100. Then, the pressure hose 92 for stopper is expanded by means of air pumping (air filling).

In this case, a portion denoted by a reference numeral 82 is the damaged portion of the sewage pipeline 100 wherein the primary repairing liquid Ta is supplied and filled. Like this, after the interior of the sewage pipeline 100 has been checked through the CCTV 60, the damage portion of the sewage pipeline 100 can be precisely repaired.

Next, the differences between the repairing method according to the present invention and the conventional repairing method will be in detail described with reference to FIG. 3.

According to the conventional repairing method, partial or total repairing for the manholes is carried out, and repairing for the sewage pipeline is carried out separately from the repairing for the manholes. In case of the household branch pipe 22 and the drainage equipment, no separate repairing method is applied such that the damaged pipe should be exchanged with new one with the consumption of time and cost, thereby performing inefficient repairing work. Generally, if the sewage pipeline buried under the ground has a relatively small diameter (e.g., under 200 mm), mechanical repairing is difficult, and thus, no repairing materials have been supplied or mounted to the interior of the sewage pipeline.

In more detail, according to the conventional repairing method, a portion on which the household branch pipe 22 is derived from the sewage pipeline 100 in FIG. 3 is sealed, and next, the sewage pipeline 100 is repaired. Then, the household branch pipe 22 having a relatively small diameter is typically exchanged with new one, without any repairing. As a result, the time consumed for the repairing becomes longer, and other consumption components become increased.

In the total environmentally-friendly trenchless repairing method according to the present invention, however, the repairing can be performed rapidly and precisely for all of the sewage pipeline 100, the manholes 10, 20 and 30, and the household branch pipe 22 or the drainage equipment (not shown). Therefore, the present invention can provide the repairing method capable of repairing the sewage pipeline, the manhole, the branch pipe, and the drainage equipment at the same time, thereby substantially reducing the repairing cost and the repairing period.

In more detail, as shown in FIG. 3, the high pressure hose 52 is connected to the cleaning and repairing vehicle 50A and supplies the repairing liquid to the damaged portion of the sewage pipeline 100, thereby performing the precise repairing for the damaged portion of the sewage pipeline 100.

The repairing process for the damaged portion of the sewage pipeline 100 will be kept explained with reference to FIG. 3.

First, the pipeline-blocking packer 70 is disposed at one side (the entire face) of the sewage pipeline 100 to block one side thereof, and the stopper 90 is disposed at the other side (back portion) of the sewage pipeline 100 to block the other side thereof. The safety stopper 96 is additionally disposed to rigidly support the stopper 90, and the pressure hose 92 for stopper is connected to the stopper 90 and the safety stopper 95 so as to supply a given pressure to them.

The packer-piercing hose 72, which is disposed to be passed through the pipeline-blocking packer 70, serves to fill and suck the repairing liquid through. The packer-piercing hose 72 has a diameter of at least 50 mm; ideally, it should have a diameter between 80 mm and 90 mm. The stopper 90 and the safety stopper 95 should be formed of a material and range capable of maintaining the air pressure supplied thereto even at the time of the expansion of the air.

The upper packer 24 is further disposed on the upper portion of the household branch pipe 22 so as to seal the upper side of the household branch pipe 2 and thus to prevent the air from being discharged to the outside. As a result, the household branch pipe 22, the manhole 10 or 20, the sewage pipeline 100 and the drainage equipment are totally blocked and sealed.

Next, the high pressure hose 52 is taken from the cleaning and repairing vehicle 50A, and the primary repairing liquid Ta is filled into the damaged portion on the sewage pipeline 100, the household branch pipe 22 and the manhole 20, thereby performing the repairing work. At this time, the damaged portion occurring on the household branch pipe 22, the damaged portion occurring on the manhole 20, and the damaged portion occurring on the sewage pipeline 100 are sequentially or selectively repaired.

FIG. 4 is a schematic sectional view showing a process for sucking the primary repairing liquid Ta filled in FIG. 3, wherein the primary repairing liquid Ta filled into the blocked section is sucked to the tank positioned inside the cleaning and repairing vehicle 50A.

That is, the primary repairing liquid Ta, which is filled into the damaged portion on the sewage pipeline 100, the household branch pipe 22 and the manhole 20 as the objects to be repaired, is sucked to develop the next step. At the sucking step, the upper packer 24 adapted to seal the household branch pipe 22 is removed, and the packer 70 disposed at one side of the sewage pipeline 100 and the stopper 90 and the safety stopper 95 disposed at the other side thereof function to block the flow of the sewage in the state of being filled with air pressure.

Figure 5:
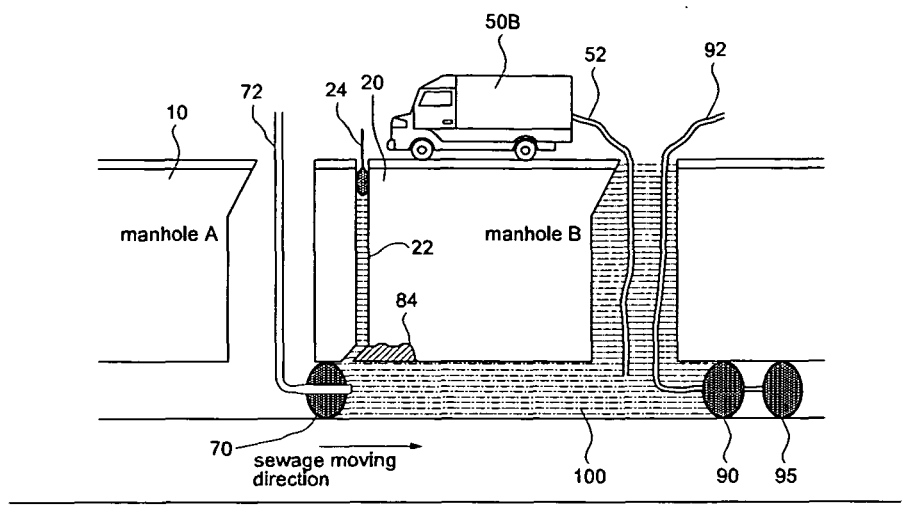
FIG. 5 is a schematic sectional view showing a process for filling a secondary repairing liquid Tb after the repairing portion has been closed.
Figure 6:
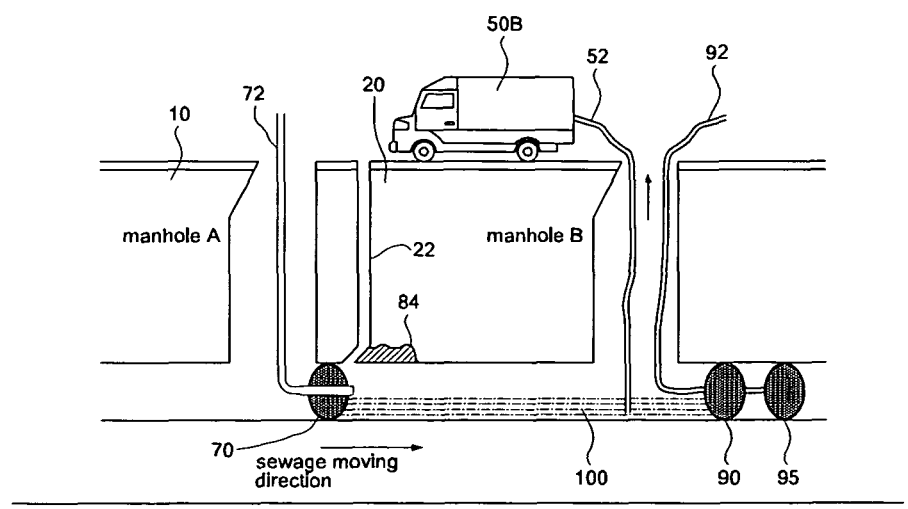
FIG. 6 is a schematic sectional view showing a process for sucking the secondary repairing liquid Tb filled in FIG. 5.

Next, FIG. 5 is a schematic sectional view showing a process for filling the secondary repairing liquid Tb after the repairing portion has been closed, and FIG. 6 is a schematic sectional view showing a process for sucking the secondary repairing liquid Tb filled in FIG. 5.

Referring to FIG. 5, first, the secondary repairing liquid Tb is filled into the repairing portion after the filling and sucking processes of the primary repairing liquid Ta as shown in FIGS. 3 and 4, and in this figure, the cleaning and repairing vehicle 50B has a repairing liquid tank and a pump mounted thereon.

According to the present invention, the primary repairing liquid Ta and the secondary repairing liquid Tb, which may be the same as each other in such a manner as to be repeatedly filled into the damaged portion, may be different from each other in such a manner as to be applied and filled into the damaged portion, or may be formed of a variety of repairing liquids. Like this, the object of the repeated filling work is to provide a perfect repairing result capable of passing the water sealing test carried out after the repairing work. The primary repairing liquid Ta is directly permeated into the damaged portion of the pipeline to fill the damaged portion therewith, and the secondary repairing liquid Tb is additionally injected and impregnated into the damaged portion and then mixed and cured with sand, soil and the materials scattered around the damaged portion. According to the total environmentally-friendly trenchless repairing method of the present invention, the primary repairing liquid Ta is first filled into the repairing portion, and next, the secondary repairing liquid Tb is mixed and cured with the surrounding materials, thereby completely preventing the occurrence of the leakage.

In FIGS. 5 and 6, the cleaning and repairing vehicle 50B includes the tank in which the secondary repairing liquid Tb is stored to supply it to the sewage pipeline 100, and after the repairing, the cleaning and repairing vehicle 50B sucks the secondary repairing liquid Tb from the sewage pipeline 100.

In the same manner as the filling and sucking processes of the primary repairing liquid Ta, the upper packer 24 is disposed to seal the household branch pipe 22, and the packer 70, the stopper 90 and the safety stopper 95 disposed at both sides of the sewage pipeline 100 are expanded to seal the both sides of the sewage pipeline 100. Next, the secondary repairing liquid Tb is filled and sucked.

FIG. 5 shows the process for filling the secondary repairing liquid Tb, and FIG. 6 shows the process for sucking the secondary repairing liquid Tb. If the secondary repairing liquid Tb is filled into the damaged portion of the interior of the manhole 20, the primary repairing liquid Ta and the secondary repairing liquid Tb are mixed and cured with the surrounding soil of the damaged portion, thereby performing total repairing for the damaged portion. After that, the remaining liquid is sucked.

Figure 7:
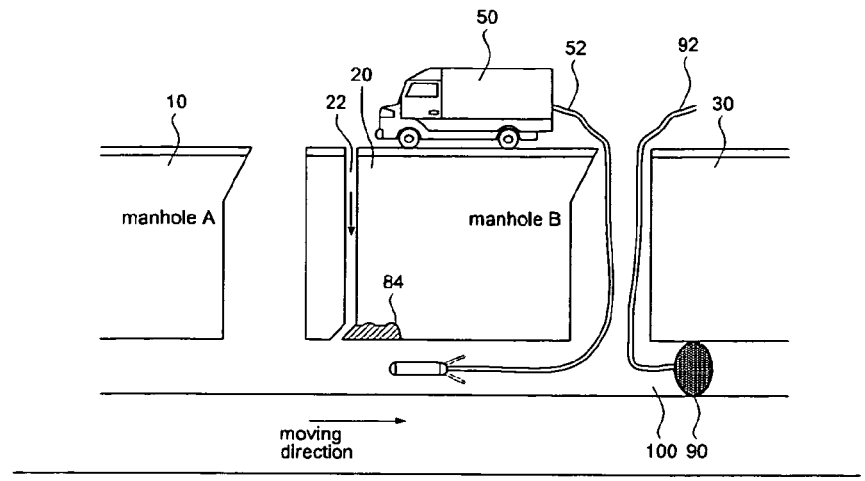
FIG. 7 is a schematic sectional view showing a process for cleaning the interior of the pipeline by using a high pressure cleaning nozzle.
Figure 8:
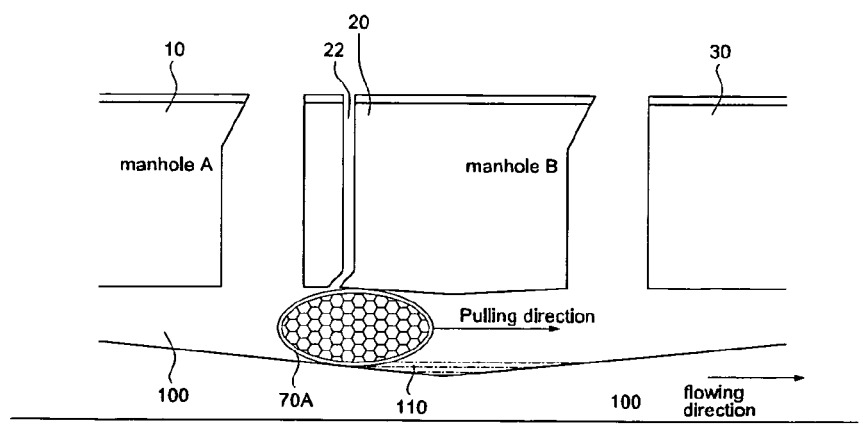
FIG. 8 is a schematic sectional view showing a process for removing repairing liquids accumulated on the bottom portion of the pipeline.

FIG. 7 is a schematic sectional view showing a process for cleaning the interior of the pipeline by using the high pressure cleaning nozzle, and FIG. 8 is a schematic sectional view showing a process for removing liquids accumulated on the bottom portion of the pipeline.

Referring to FIG. 7, the high pressure cleaning nozzle is mounted on the end portion of the high pressure hose 52 taken from the cleaning and repairing vehicle 50 and is moved along the sewage pipeline 100 to inject water at high pressure to the foreign materials attached on the sewage pipeline 100, the household branch pipe 22, and the manhole 20, thereby performing intermediate cleaning. At this time, the cleaning is performed by separating other attached foreign materials as well as the sucked repairing liquid after filling from the sewage pipeline 100, the household branch pipe 22, and the manhole 20.

First, the water used for the cleaning is sucked, and the repairing liquids (the primary repairing liquid Ta and the secondary repairing liquid Tb) are filled. Next, the stopper 90 disposed at one end of the sewage pipeline 100 is opened and discharged. The secondary repairing liquid Tb as shown in FIG. 7 remains thereon after being applied to the damaged portion.

Referring to FIG. 8, the flexible packer 70A is disposed at a position where the sewage pipeline 100 and the household branch pipe 22 are divided and is pulled toward a direction (in a direction of an allow) along which the sewage flows to remove and discharge the liquid accumulated on the bottom portion 110, thereby performing the cleaning for the sewage pipeline 100 and the household branch pipe 22. At this time, the flexible packer 70A is formed of a scrapper or a rubber material and is brought into close contact with the sewage pipeline 100 to remove the remaining repairing liquids. The flexible packer 70A may be used with the pipeline-blocking packer 70.

Figure 9:
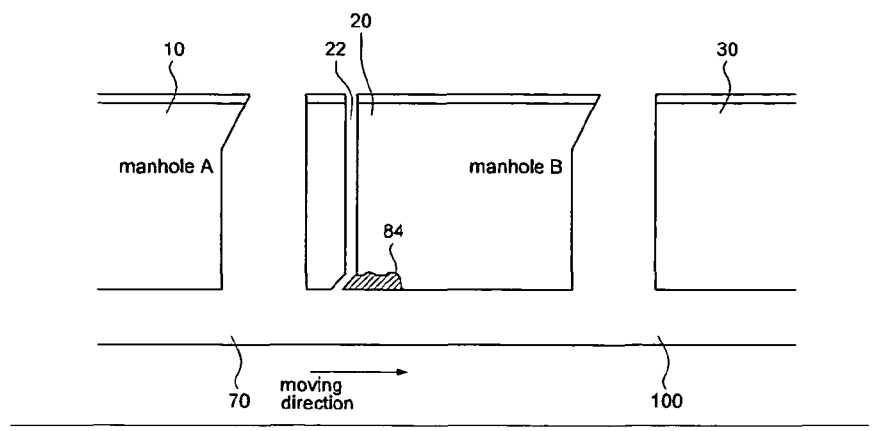
FIG. 9 is a schematic sectional view showing the internal state of the pipeline after the repairing and cleaning of the pipeline have been completed in the total environmentally-friendly trenchless repairing method according to the present invention.

After the intermediate cleaning is performed, the cleaning completion state is shown in FIG. 9. FIG. 9 is a schematic sectional view showing the internal state of the pipeline after the repairing and cleaning of the pipeline have been completed in the total environmentally-friendly trenchless repairing method according to the present invention. As shown, after the repairing and cleaning for the sewage pipeline, the household branch pipe and the manhole have been completed, they are maintained in a cleaned state, without having any leakage, and in this case, their internal state is checked through the CCTV and the like.

In Table 1 as listed below, the principal properties of the primary repairing liquid Ta and the secondary repairing liquid Tb applied to the total environmentally-friendly trenchless repairing method according to the present invention are explained. The repairing liquids as shown are determined by a user's selection, but of course, they may have different specifications from those explained in Table 1 in accordance with the regulations in the use of chemicals set by a managing agency.

TABLE 1

|  | Primary Repairing liquid | Secondary repairing liquid |
| --- | --- | --- |
| Shape | High viscosity and Colorless liquid | Opaque white liquid |
| Density at 20° C. | 1.39 ± 0.05 g/cm$^3$ | 1.05 ± 0.05 g/cm$^3$ |
| Smell | No smell | A little sweet and sour smell |
| Viscosity at 20° C. (mPa * s) | 170 ± 70 | >40 |
| Water solubility | Complete mixing | Complete mixing |
| pH value at 20° C. | About 12 | 4.3-5.3 |
| Conductivity | — | 1.00-5.00 |
| Combustibility | No | No |
| Storage | 12 months in closed state at 5° C.-30° C. | 12 months in closed state at 5° C.-30° C. |
| Dangerous material | No | No |
| Protection tool | Gloves and goggles | Gloves and goggles |

As apparent from Table 1, the primary repairing liquid is colorless and has a density of 1.39±0.05 g/cm$^3$ at a room temperature of 20° C. Further, it does not have any smell and has a viscosity of 170±70 mPa*s at 20° C. Also, it is water soluble and is thus completely mixed with water. The primary repairing liquid has a pH value of about 12 at 20° C. and is incombustible. Moreover, it can be stored for 12 months in closed state at 5° C. to 30° C. and is not treated as a dangerous material. The protection tools for the primary repairing liquid are gloves and goggles.

As apparent from Table 1, the secondary repairing liquid is an opaque white liquid and has a density of 1.05±0.05 g/cm$^3$ at a room temperature of 20° C. Further, it has a slight odor and has a viscosity of more than 40 mPa*s at 20° C. Also, it is water soluble and is thus completely mixed with water. The secondary repairing liquid has a pH value of about 4.3 to 5.3 at 20° C. and conductivity of 1.00 to 5.00 and is incombustible. Moreover, it can be stored for 12 months in closed state at 5° C. to 30° C. and is not treated as a dangerous material. The protection tools for the secondary repairing liquid are gloves and goggles.

Figure 10:
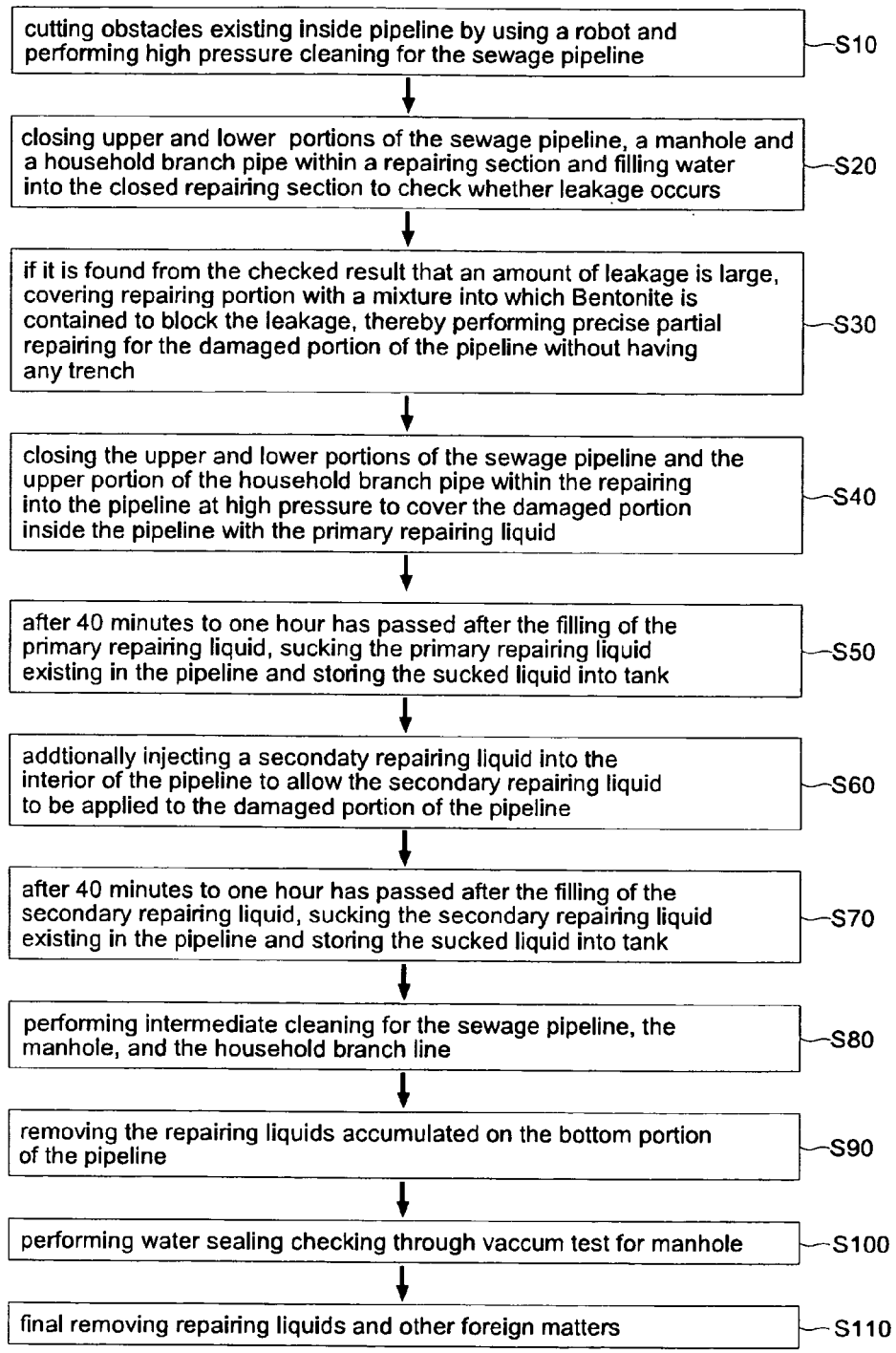
FIG. 10 is a flowchart showing a procedure of the total environmentally-friendly trenchless repairing method according to the present invention.

Next, FIG. 10 is a flowchart showing a procedure of the total environmentally-friendly trenchless repairing method according to the present invention. An explanation on the total environmentally-friendly trenchless repairing method will be in detail given with reference to FIG. 10.

First, step S10 is a typical process. At this step, obstacles existing inside the interior of the sewage pipeline are cut by using a robot, and the interior of the sewage pipeline is photographed by using the CCTV. Next, high pressure cleaning for the sewage pipeline is performed.

At next step S20, the upper and lower sides of the upper and lower portions of the sewage pipeline, a manhole and a household branch pipe within a repairing section (portion) are closed, and water is filled into the closed repairing portion to check whether leakage occurs or not therefrom.

At this step, unlike the conventional repairing methods, the sewage pipeline, manhole, household branch pipe and drainage equipment disposed within the repairing section are all blocked, and in this state, then, the leakage is checked.

At next step S30, if it is found from the checked result that an amount of leakage is large, the repairing portion is covered with a mixture into which Bentonite is contained to block the leakage, thereby precisely performing partial trenchless repairing for the damaged portion of the pipeline.

This step can be rapidly performed especially when the damaged portion of the sewage pipeline can be observed through the CCTV. That is, the repairing portion is covered with the mixture into which Bentonite is contained to block the leakage, thereby precisely performing partial trenchless repairing for the damaged portion of the pipeline.

After that, at step S40, if the leakage is kept after the partial repairing for the leaking portion, the upper and lower portions of the sewage pipeline and the upper portion of the household branch pipe within the repairing section are closed, and the primary repairing liquid Ta is filled into the pipeline at high pressure to cover the damaged portion inside the pipeline with the primary repairing liquid Ta.

At this step, the primary repairing liquid Ta having the properties as listed in Table 1 are injected and permeated into the interior of the damaged portion, thereby filling the crack portions formed thereon.

After that, at next step S50, after a given time period in a range between 40 minutes and one hour has passed after the filling of the primary repairing liquid Ta, the primary repairing liquid remaining in the pipeline is sucked and stored into the tank mounted on the high pressure cleaning vehicle.

After the sucking step of the primary repairing liquid Ta, at step S60, the secondary repairing liquid Tb is additionally injected into the interior of the pipeline and is impregnatedly permeated through the damaged portion of the pipeline, and next, the secondary repairing liquid Tb is mixed with sand, soil, or matters existing the gaps in the sand or soil scattering around the pipeline and is then cured.

At this step, the secondary repairing liquid Tb is injected into the primarily repaired-damaged portion of the sewage pipeline, manhole, household branch pipe and drainage equipment, thereby coating the cracked portion of the pipeline and mixing with the sand, soil, or matters existing the gaps in the sand or soil scattering around the pipeline. After that, the secondary repairing liquid Tb is cured to more safely repair the sewage pipeline. Especially, the secondary repairing liquid Tb is mixed with the foreign matters like soil scattering around the pipeline, such that the cracked portion can be rigidly and gently repaired. Further, unlike the conventional repairing method wherein a separate repairing tube is inserted, the liquid that gives no bad influences on the environment is applied, such that advantageously, the diameter of the pipeline after repairing is not reduced.

Next, at step S70, after a given time period in a range between 40 minutes and one hour has passed after the filling of the secondary repairing liquid Tb, the secondary repairing liquid Tb remaining in the pipeline is sucked and stored into a tank.

When the above-mentioned time period is passed, the secondary repairing liquid Tb can be sufficiently permeated into the surrounding materials and can be fully cured, which is checked through the tests carried out by the present applicant.

The principal properties of the secondary repairing liquid Tb are listed in Table 1.

After the sucking of the secondary repairing liquid Tb, at step S80, intermediate cleaning for the sewage pipeline, the manhole, and the household branch line is performed.

At this step, after the filling and sucking processes are performed two times, the intermediate cleaning for the sewage pipeline, the manhole, and the household branch line is performed.

Next, at step S90, the repairing liquids accumulated on the bottom portion of the pipeline are removed after the intermediate cleaning of the pipeline.

The primary repairing liquid Ta and the secondary repairing liquid Tb, which remain on the pipeline after they have been injected into the damaged portion of the pipeline, are removed to fundamentally prevent the environmental pollution.

After that, at step S100, water sealing checking is performed through a vacuum pressure test for the manhole, and at step S110, the CCTV is moved to the interior of the pipeline to check the state after the completion of the repairing work, such that after checking, the repairing liquids and other foreign matters existing thereinto are finally removed.

As described above, there is provided the total environmentally-friendly trenchless repairing method according to the present invention that is capable of performing total repairing for sewage pipelines, manholes, household branch pipes and drainage equipment in rapid and precise manners. In the conventional practices, as mentioned above, the household branch pipes and drainage equipment are difficult to repair because of their small diameter, without any exchange, but according to the present invention, the sewage pipelines, manholes, household branch pipes and drainage equipment are totally repaired at the same time, thereby substantially reducing the repairing cost and time.

In addition, the total repairing method according to the present invention can be performed for the sewage pipelines, manholes, household branch pipes and drainage equipment, without any reduction in the diameter of the repairing pipeline.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of repairing a sewage pipeline without forming a trench, comprising:
    closing upper and lower portions of the sewage pipeline, a manhole, and an upper portion of a household branch pipe within a repairing section and filling a primary repairing liquid into the sewage pipeline at a preset pressure to allow the primary repairing liquid to be permeatedly applied to a damaged portion of the sewage pipeline;
    upon lapse of a first time period after filling the primary repairing liquid, sucking the primary repairing liquid in the sewage pipeline to remove the primary repairing liquid from the sewage pipeline;
    injecting a secondary repairing liquid into an interior of the sewage pipeline to allow the secondary repairing liquid to be impregnatedly permeated through the damaged portion of the pipeline;
    upon lapse of a second time period after the injection of the secondary repairing liquid, sucking the secondary repairing liquid in the sewage pipeline to remove the secondary repairing liquid from the sewage pipeline;
    cleaning the sewage pipeline, the manhole, and the household branch pipe after sucking the secondary repairing liquid; and
    removing the primary and secondary repairing liquids remaining on a bottom portion of the sewage pipeline after the cleaning the sewage pipeline.

2. The method of claim 1, further comprising, prior to the step of closing the upper and lower portions of the sewage pipeline:
    removing obstacles existing inside the interior of the sewage pipeline, visually inspecting the interior of the sewage pipeline, and performing high pressure cleaning of the sewage pipeline.

3. The method of claim 2, wherein a robot is used to perform the step of removing the obstacles.

4. The method of claim 1, further comprising, after the step of closing the upper and lower portions of the sewage pipeline:
- filling water into the sewage pipeline to check whether leakage occurs or not therefrom; and
- if the leakage is beyond a preset threshold, covering the repairing portion with a mixture containing bentonite to block the leakage.

5. The method of claim 1, further comprising, after the step of sucking the secondary repairing liquids to remove the secondary repairing liquid from the sewage pipeline:
- performing water sealing checking through a vacuum pressure test for the manhole; and
- visually inspecting the interior of the sewage pipeline to check a state of the sewage pipeline.

6. The method of claim 5, further comprising, after the step of visually inspecting the interior of the sewage pipeline:
- removing the primary and secondary repairing liquids and other foreign materials remaining in the sewage pipeline.

7. The method of claim 5, wherein a closed circuit television is used for the visual inspection.

8. The method of claim 1, further comprising, after the step of sucking the primary repairing liquid to remove the primary repairing liquid from the sewage pipeline:
- storing the sucked primary repairing liquid into a tank.

9. The method of claim 1, further comprising, after the step of sucking the secondary repairing liquid to remove the secondary repairing liquid from the sewage pipeline:
- storing the sucked secondary repairing liquid into a tank.

10. The method of claim 1, wherein the first time period ranges from 40 minutes to one hour.

11. The method of claim 1, wherein the second time period ranges from 40 minutes to one hour.

12. The method of claim 1, wherein the second repairing liquid is adapted to be mixed with a material existing around the sewage pipeline before curing.

13. The method of claim 12, wherein the material includes one or more of sand, gravel, and soil.

14. The method of claim 1, wherein the step of closing upper and lower portions of the sewage pipeline and the upper portion of the household branch pipe includes:
- disposing a pipeline-blocking packer on the upper portion of the sewage pipeline in such a manner as to be expanded to block the upper portion of the sewage pipeline, a stopper on the lower portion thereof in such a manner as to be expanded to block the lower portion thereof, a safety stopper on a back of the stopper in such a manner as to firmly support the stopper, and an upper packer on the upper portion of the household branch pipe in such a manner as to be expanded to block the upper portion of the household branch pipe.

15. The method of claim 14, wherein, in the steps of filling the primary repairing liquid, sucking the primary repairing liquid to remove the primary repairing liquid from the sewage pipeline, injecting the secondary repairing liquid, and sucking the secondary repairing liquid to remove the secondary repairing liquid from the sewage pipeline, the sewage pipeline, the manhole and the household branch pipe are blocked at the same time and repaired at the same time.

* * * * *